United States Patent [19]

Heilos et al.

[11] 4,003,983

[45] Jan. 18, 1977

[54] PROCESS OF PREPARING DICYAN

[75] Inventors: Johannes Heilos, Seligenstadt; Werner Heimberger, Hanau am Main; Theodor Lüssling, Grossauheim; Wolfgang Weigert, Offenbach (Main), all of Germany

[73] Assignee: Deutsche Gold- und Silber-Scheideanstalt vormals Roessler, Frankfurt, Germany

[22] Filed: Jan. 23, 1975

[21] Appl. No.: 543,367

Related U.S. Application Data

[63] Continuation of Ser. No. 124,866, March 16, 1971, abandoned.

[30] Foreign Application Priority Data

| | | |
|---|---|---|
| Mar. 17, 1970 | Germany | 2012509 |
| May 8, 1970 | Germany | 2022454 |
| May 8, 1970 | Germany | 2022455 |

[52] U.S. Cl. ..... 423/384

[51] Int. Cl.² ..... C01C 3/00

[58] Field of Search ..... 423/384, 582, 588

[56] References Cited

UNITED STATES PATENTS 3,494,734 2/1970 Nakamura ..... 423/384

FOREIGN PATENTS OR APPLICATIONS 199,849 11/1967 U.S.S.R. ..... 423/384

*Primary Examiner*—Earl C. Thomas
*Attorney, Agent, or Firm*—Cushman, Darby & Cushman

[57] ABSTRACT

Cyanogen is prepared by passing hydrogen cyanide together with hydrogen peroxide into a solution of copper(II) bromide, chloride, cyanide, nitrate, or sulfate containing ferric ions that is maintained at a temperature between 0° and 100° C.

7 Claims, 1 Drawing Figure

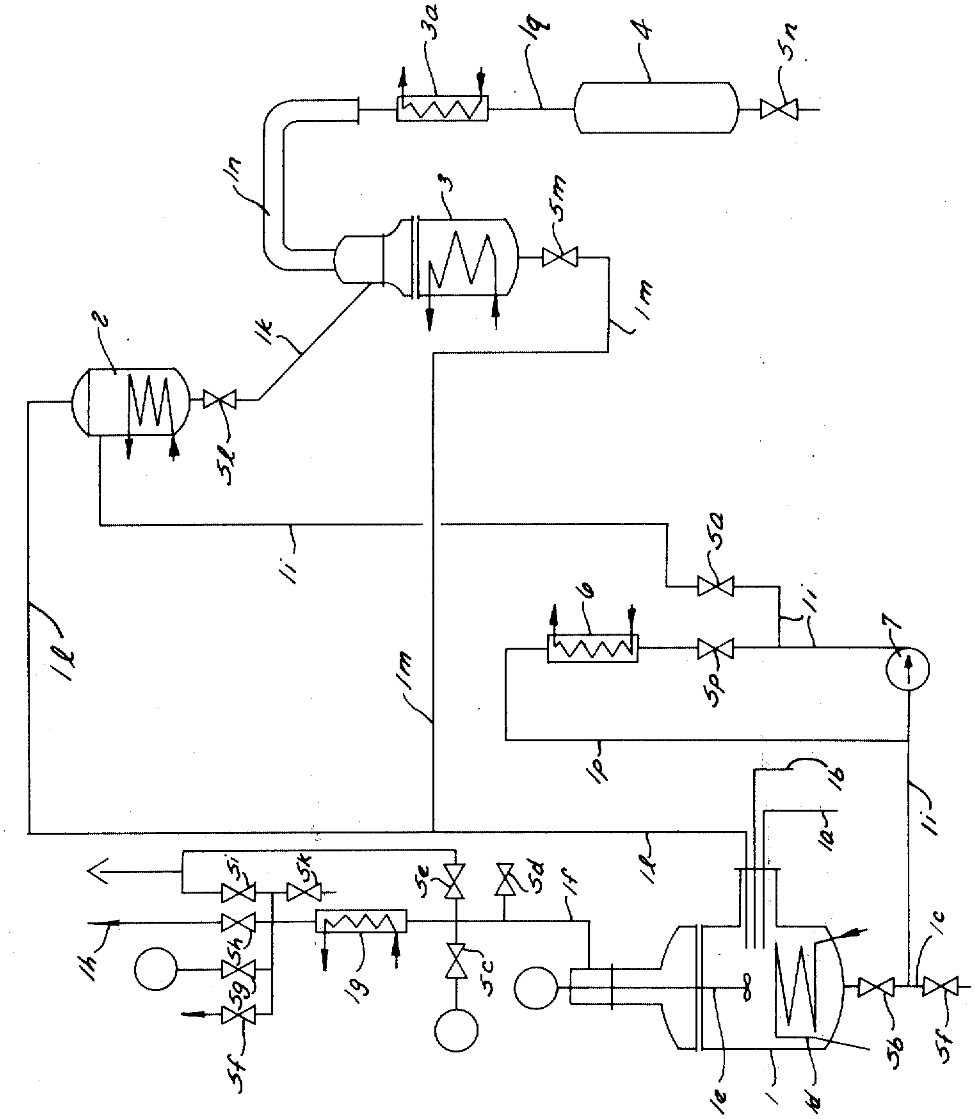
INVENTORS
JOHANNES HEILOS
WERNER HEIMBERGER
THEODOR LÜSSLING
WOLFGANG WEIGERT
BY
ATTORNEY

PROCESS OF PREPARING DICYAN

REFERENCE TO RELATED APPLICATION

This application is a continuation of our application Ser. No. 124,866, filed Mar. 16, 1971, now abandoned.

This invention relates to an improved process for preparing dicyan (which is also known as cyanogen).

From German Auslegeschrift No. 1,297,587 which corresponds to U.S. Pat. No. 3,494,734, it is known to prepare dicyan by reaction of hydrocyanic acid which is also known as cyanogen with nitrogen dioxide and water in the presence of a copper(II) salt. While according to this process the dicyan is recovered in satisfactory yield, it has the disadvantage that the formed dicyan contains about equimolar amounts of nitrogen monoxide.

As a result, the handling of such gas mixtures on a technical scale is very objectionable because of the possibility of the formation of explosive mixtures and also because the isolation of pure dicyan can only be accomplished at considerable technical expense.

It has also already been proposed (German patent 1,163,302) to prepare dicyan by reacting hydrocyanic acid with gaseous oxygen in the presence of a copper-(II) salt and an oxygen activator under the strict maintenance of pH values in the strongly acid range. This process can only be carried out on a technical scale with difficulty, because of the large excess of oxygen present as compared to hydrocyanic acid which must subsequently be separated off from the dicyan and also because of the very precise control of the pH value required. In addition, the copper(II) salt solution must, prior to the reaction, be heated to about 80° C in order to increase the reaction velocity.

Further, from experimental tests which were carried out, it has been established that by the use of anthrahydroquinone as an oxygen activator, a special peak is observed in the gas chromatogram which does not appear when hydrogen peroxide is used instead of oxygen and anthrahydroquinone. This would appear to indicate a different reaction course. The yield of dicyan amounts, however, to only 10–20%. It therefore equals the yield of dicyan obtained when oxygen alone is used. It was also found that the addition of anthrahydroquinone resulted in no change in the dicyan yield.

Nevertheless, the throughput of hydrocyanic acid in the aforesaid process is very low, as can be seen from Example 1 of German patent No. 1,163,302 and this is not essentially accelerated by the addition of oxygen transferors or activators. As is known, the formation of dicyan from hydrogen cyanide in the presence of a copper(II) salt takes place according to the following reaction scheme:

$$2\,Cu^{2+} + 4\,HCN \rightarrow 2\,CuCN + (CN)_2 + 4\,H^+ \qquad (I)$$

This reaction comes to a halt after the copper(II) ions have been used up and when it is not possible to oxidize the formed copper(I) cyanide rapidly enough into copper(II) ions according the reaction scheme (II) which follows:

$$2\,CuCn + 4\,HCl + O\cdot \xrightarrow{2} 2\,Cu^{2+}Cl_2 + 2\,HCN + H_2O \qquad (II)$$

In the aforementioned Example 1 of German patent 1,163,302 there is used as catalyst amounts of copper-(II) chloride hydrate which are 4.75-fold that amount which is calculated as necessary in accordance with reaction scheme (I) for converting the hydrogen cyanide within an hour into dicyan. From this there can be appreciated the difficulty which arises with respect to the reoxidation of copper(I) ions in the reaction process according to the cited patent.

In accordance with the invention it has now been found that pure dicyan in very good yields and in technically acceptable times can be obtained by reacting hydrocyanic acid with hydrogen peroxide in the presence of copper(II) bromide, chloride, cyanide, nitrate, or sulfate, and if the velocity of the reoxidation of the copper(I) ions to copper(II) ions, on which the throughput velocity of the entire process depends, is essentially increased by addition of iron(III) ions to the reaction mixture and, further, if the decomposition tendency of the hydrogen peroxide is decreased by conducting the reaction in the presence of certain organic solvents.

It is to be considered most surprising that the relatively rapid proceeding decomposition of the hydrogen peroxide into water and oxygen which takes place in the presence of cupric and ferric ions is almost entirely inhibited and that the oxidation potential of the hydrogen peroxide to the favor of the reaction scheme (II) with the desired reoxidation of cuprous to cupric ions takes place as a result of the combined reaction wherein the ferrous ions are converted to ferric ions according to the reaction scheme (III) which follows:

$$[2]\ Cu^+ + Fe^{3+} \rightarrow Cu^{2+} + Fe^{2+} \qquad (III)$$
$$[b]\ 2\,Fe^{2+} + 2\,H^+ + O\cdot \rightarrow Fe^{3+} + H_2O$$

This reaction course is further favored through the addition of an organic solvent. The addition of a water-miscible solvent in this connection has a favorable influence on any tendency of the hydrogen peroxide to undergo a change, and this above all at temperatures above 20° C, that is the decomposition into water and molecular oxygen of the hydrogen peroxide is thereby inhibited. A similar effect is obtained also with water immiscible organic solvents. Through the use of these solvents, the possibility is provided that the hydrogen peroxide in the presence of the organic solvent in the aqueous carrier solution is caused to react and thereafter the solution without a further dilution with water again charged.

The presence of ferric salts in a pure aqueous reaction solution accelerates the reoxidation of cuprous(I) to cupric(II) ions according to reaction schemes (IIIa) and (IIIb) so rapidly that, also in this case, no decomposition of the hydrogen peroxide into water and molecular oxygen can take place. It follows that the reaction in an organic solvent using ferric and cupric ions provides optimal reaction conditions whereby the best results are obtained. The reaction of hydrocyanic acid with hydrogen peroxide is, under these conditions, so rapid that the velocity of the throughput of the hydrocyanic acid is solely dependent upon the velocity of the taking off of the reaction heat, that is, the faster the heat of reaction can be taken off, that much more of the hydrocyanic acid can be put through.

The hydrogen cyanide is introduced into the reaction in gaseous or liquid form. Aqueous solutions of the hydrocyanic acid can also be used, which solutions contain at the minimum 5% by weight hydrocyanic acid as well as waste or spent acid.

In the process of the invention, the cupric salts and also the corresponding ferric salts are present in the reaction mixture in a concentration of up to 20% (total of both salts) and preferably the cupric and ferric salts are present in equivalent amounts. A preferred amount of the salt, i.e., the total of the two salts, amounts to about 10% by weight. The cupric and ferric salts can be used in the reaction in their commercially available form.

The reaction is carried out at temperatures of 0°–100° C, and preferably at a temperature from 15°–50° C. The pressure can be varied as desired. Thus, it is possible to conduct the reaction at normal pressure, slight underpressures, and also at slight excess pressures. The underpressure must not be that high that the boiling point of the hydrocyanic acid is exceeded. Preferably an excess pressure of 1–5 atm. is used.

The hydrogen peroxide is used in the form of an aqueous solution thereof 3-90% by weight and preferably as a 15 - 50 % by weight solution. In addition, hydrogen peroxide solution in organic solvents can be used, as for instance described in German patent applications P 18 02 003.6 and P 19 51 211.9.

Hydrocyanic acid and hydrogen peroxide (100%) are reacted with each other in the stoichiometric amounts required by the equation: $2HCN + H_2O_2 \rightarrow (CN)_2 + H_2O$.

As examples of water-miscible and water-immiscible solvents which may be used in accordance with the invention, there come into consideration first of all the alkyl esters of lower fatty acids, for instance alkyl acetates. Ethyl and n-propyl acetate have been found to be particularly suitable. In addition, alkyl sulfones and in particular tetramethylene sulfone (which has the formula

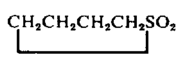

and is also known as sulfolane and thiophan sulfone) have proved advantageous in use. The organic solvent can be present in the reaction medium in an amount of up to 80% by weight, and preferably in an amount of 30-50% by weight.

The reaction components and the salt solution are mixed in conventional manner, for instance in drum mixers, screw mixers, and the like. A particularly favorable manner of proceeding when using organic hydrogen peroxide solutions is for the hydrogen peroxide solution to be introduced into a mixture of the hydrocyanic acid and an aqueous salt solution.

The technical advantages of the process of the invention lie in that there is thereby recovered an almost pure dicyan which is free of oxygen and nitrogen monoxide and which is obtained in very good yields. Further, the space-time yield is essentially increased and, depending on the rapid removal of the reaction heat, amounts to ten- to a hundredfold the heretofore realized space-time yield values obtained with the direct oxidation of hydrocyanic acid in the presence of copper(II) salts.

The following examples are given in order to more fully illustrate the invention, but in no wise are to be construed as limiting the scope thereof.

COMPARATIVE EXAMPLE

Into a 250 ml round-bottom flask provided with a stirrer, thermometer, reflux cooler and an inlet dip tube, there were introduced 11.2 g (0.05 mol) copper bromide dissolved in 50 ml tetramethylene sulfone and then over a 50 minute period there was introduced in dropwise fashion into the resulting solution a mixture of 10.8 g liquid hydrogen cyanide and 43 ml of aqueous hydrogen peroxide solution (15%). The positive heat of reaction was removed by cooling with ice water and strong stirring and the temperature maintained constant at 23° C. There were recovered through condensation of the resulting dicyan gases a yield of about 80% of theory, calculated on the hydrogen peroxide used. The dicyan contained, according to gas chromatic graphic analysis, only traces of oxygen, hydrogen cyanide and water.

COMPARATIVE EXAMPLE 1

In an apparatus as described in the foregoing Comparative Example 11.2 g copper bromide and 14.8 g (0.05 mol) iron bromide were dissolved in 50 ml. water and under strong stirring cooled with ice water. Over a 60 minute period a mixture of 16.2 g liquid hydrogen cyanide and 64.5 ml 15% aqueous hydrogen peroxide was introduced in dropwise manner, and the temperature of the resultant reaction mixture maintained between 10° and 14° C. The gas which was recovered contained 85-90% of theory of dicyan, calculated on the hydrogen peroxide and showed on gas chromatographic analysis only traces of oxygen, hydrogen cyanide and water.

COMPARATIVE EXAMPLE 2

Using the apparatus described in the foregoing comparative Example 1, 11.2 g copper bromide and 14.8 g iron bromide in 50 ml tetramethylene sulfone were cooled with ice water. Over a period of 75 minutes, a mixture of 27 g liquid hydrogen cyanide and 107.5 ml 15% aqueous hydrogen peroxide was added dropwise and a reaction temperature maintained of between 10° and 14° C. After condensing the resulting gases 26.4 g condensate were recovered which, according to the gas chromatograph, contained 95% pure dicyan. As a control the condensate was heated up to 0° C and the corresponding gas chromatographically analyzed. There was present pure dicyan in an amount of 23.2 g, that is, 89.2% of theory, calculated on the hydrogen peroxide. The 3.2 g residue consisted only of hydrogen cyanide and water.

Following two days of standing of the reaction solution, a further 2.5 g oxamide was isolated which by warming the solution could be obtained as dicyan gas. The total yield amounted then to 95.4% of theory, calculated on the hydrogen peroxide.

If the beforementioned 89.2% of theory is calculated on 1 kg dicyan recovered per hour, then for this amount, a reaction space of 8.5 l is noted, that is the space-time yield is 8.5 $l/kg.h^{-1}$. Through the use of concentrated hydrogen peroxide solution, these space-time yields can be increased by a multiple of that just noted.

EXAMPLE 3

In the accompanying drawing is diagrammatically illustrated an apparatus suitable for use in carrying out commercially in a continuous manner a process in accordance with the invention. Using such an apparatus, a solution of 1.74 kg copper (II) bromide and 2.3 kg iron(III) bromide in 20.0 kg water was introduced via line 1*c* into reactor 1 which was equipped with a heat exchanger **1*d* and a stirrer 1*e*. The solution of copper and iron bromides was circulated in the direction of the distillation apparatus 2 and 3 back to the reactor 1 with the help of pump 7. Stoichiometrically equivalent amounts of hydrogen cyanide and hydrogen peroxide (2 moles hydrogen cyanide + 1 mole hydrogen peroxide) were introduced through the lines 1***a* and 1*b* into the reaction solution. At the head of the reactor 1, the formed dicyan gas is taken off via line 1*f* and a cooler 1*g* in which any carried-along hydrogen cyanide vapors were condensed and taken off via line 1*h* for further use.

The reaction solution for the continuous separation of the carried-along hydrogen peroxide solution and of the water formed in the reaction was taken off by a line 1*i* and introduced into the distilling apparatus 2 where it was also freed of any dissolved dicyan gas and as yet unreacted hydrogen cyanide. Any gas taken off from the distilling apparatus 2 was via line 11 reintroduced into reactor 1. The residual solution in the distilling apparatus 2 was passed through the line 1*k* into the distilling apparatus 3. Then the reaction solution in the distilling apparatus 3 (water distillation) was concentrated and via lines 1*m* and 1*l* fed back into reactor 1. The water distilled off in distilling apparatus 3 was discharged via line 1*n*, heat exchanger 3*a* and line 1*g* into the water receiver 4. Within 9 in this apparatus, at a reaction temperature of 35° C (maintained constant through the cooling coil 1*d* in reactor 1) and a pressure of 0.03 atm. excess pressure 13.42 kg hydrogen cyanide, and 24.00 kg 35% by weight aqueous hydrogen peroxide solution were reacted. There were thereby recovered 5950 l corresponding to 12.62 kg dicyan crude gas which, according to gas chromatographic analysis, had the following composition 98.08% dicyan 0.20% oxygen 1.70% nitrogen The yield amounted to 97.6% of theory.

In case it is required, the reaction mixture can be maintained at constant temperature in the circulation consisting of line 1*i*, heat exchanger 6 and line 1*p* with the help of the pump 7.

The reference numerals 5*a*–5*p* in the drawing designate valves.

EXAMPLE 4

Using the apparatus of Example 3, a solution of 1.74 kg copper(II) bromide and 2.30 kg iron(III) bromide in 15.00 kg water and 6.0 kg tetramethylene sulfone were reacted in the same manner within 6 hours with the following reaction components: 8.50 kg hydrogen cyanide and 15.92 kg 35 wt.-% aqueous hydrogen peroxide solution. The reaction temperature was maintained constant at 35° C. At a mild operpressure of 0.03 atm. excess pressure, there were recovered 3770 l, corresponding to 8.20 kg dicyan gas (98.5% of dicyan). The yield amounted to 98% of theory. The same results were obtained when the bromide was replaced by the corresponding sulfate, cyanide or nitrate.

EXAMPLE 5

In a 250 cc round-bottom flask equipped with a stirrer, thermometer, reflux cooler and inlet dip tube, 17.1 g $CuCl_2.2H_2O$ (0.1 mole) and 27.0 g $FeCl_3.6H_2O$ (0.1 mole) were dissolved in 100 g water and, under stirring at 30° C, the solution then introduced within 60 minutes into 16.2 g (0.6 mole) hydrogen cyanide and 10.2 cc 30% (0.3 mole) hydrogen peroxide solution. The gas thereby formed was analyzed chromatographically. It contained constant 55% dicyan and about 15% chlorcyan which is also known as cyanogen chloride. The remainder consisted of oxygen and hydrogen cyanide.

EXAMPLE 6

Using the apparatus of Example 5, 17.1 g $CuCl_2.2H_2O$ (0.1 mole) and 27.0 g $FeCl_3.6H_2O$ (0.1 mole) were dissolved in 100 g tetramethylene sulfone and under stirring at 45° C within 60 minutes, the resulting solution introduced into 16.2 g (0.6 mole) hydrogen cyanide and 10.2 cc 30% (0.3 mole) hydrogen peroxide solution.

The thus-recovered gas was analyzed by gas chromatography. It contained constant 62% dicyan and about 5% chlorcyan. The balance consisted of oxygen and hydrogen cyanide.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for the production of cyanogen which comprises reacting hydrogen cyanide with hydrogen peroxide at a temperature between 0° and 100° C in the presence of ferric ions and a copper salt selected from the group consisting of copper(II) bromide, chloride, cyanide, nitrate, and sulfate.

2. A process as defined in claim 1 for the production of cyanogen which comprises adding to a solution of a cupric salt in a liquid a mixture of hydrogen cyanide and hydrogen peroxide and subsequently recovering the cyanogen thus produced.

3. A process as defined in claim 2 in which the solution contains approximately equimolecular proportions of copper(II) and ferric ions.

4. A process as defined in claim 2 in which the ferric ions are supplied by a salt selected from the group consisting of ferric bromide and ferric chloride.

5. A process as defined in claim 2 in which the hydrogen peroxide is an aqueous solution containing between 15 and 50% by weight of hydrogen peroxide.

6. A process as defined in claim 2 in which the temperature is maintained between 15 and 50° C and the pressure at a superatmospheric pressure between 1 and 5 atmospheres.

7. A process as defined in claim 2 in which the liquid from which the solution is prepared is selected from the group consisting of water, ethyl acetate, n-propyl acetate, and sulfolane.

* * * * *